United States Patent Office 3,522,320
Patented July 28, 1970

3,522,320
METHOD OF MAKING BARIUM STYPHNATE
Harold F. Bluhm, Tamaqua, Pa., assignor to Atlas Chemical Industries, Inc., Wilmington, Del., a corporation of Delaware
No Drawing. Filed Apr. 17, 1964, Ser. No. 360,756
Int. Cl. C07c 79/30
U.S. Cl. 260—622                                    2 Claims

ABSTRACT OF THE DISCLOSURE

Crystalline barium styphnate of uniform, fine particle size prepared by reacting at a temperature of about 25° to about 80° C. a solution of styphnate salt selected from the group consisting of ammonium styphnate and alkali metal styphnate with a water-soluble barium salt useful as an ignition mixture, explosive initiator and as propellants in explosively actuated motors.

The present invention relates to the production of barium styphnate and in particular, to the production of barium styphnate (barium trinitroresorcinate), from styphnic acid (trinitroresorcinol, or 2,4 dihydroxy 1,3,5 trinitrobenzene) and styphnic acid salts.

The present invention provides a method of producing a crystalline barium styphnate product which has a fine particle size and has a small size distribution. In accord with the present invention, a particulate, free flowing barium styphnate product of a uniform size, in a range from about 5 to about 200 microns is produced. Barium styphnate is an explosive and the products of the present invention are useful as ignition mixtures, as components of ignition mixtures, as explosive initiators, and as propellants or components of propellants in explosively actuated motors.

In accord with the present invention, barium styphnate is produced by the reaction of a barium salt and a styphnate salt selected from the group consisting of ammonium styphnate and alkali metal styphnates. Preferably the reaction takes place in an aqueous medium wherein an aqueous solution of styphnate salt is reacted with a water-soluble barium salt. The barium styphnate product is precipitated from the solution and may be recovered by filtration. Suitable barium salts which may be utilized to precipitate barium styphnate, for example, are barium chloride, barium acetate, barium hydroxide and barium nitrate.

In carrying out the present invention a suitable ammonium styphnate salt product may be obtained by reacting styphnic acid and ammonium hydroxide. The formed ammonium salt may be treated with an alkali metal hydroxide to form an alkali metal styphnate which may then be treated with a water soluble barium salt. Generally the step wherein an ammonium salt is converted to an alkali metal salt before precipitation produces a barium styphnate product having a smaller particle size than when the alkali metal salt step is omitted. Sodium hydroxide generally produces a product having a smaller particle size than potassium hydroxide. Relatively low precipitation temperatures, suitably from about 25° C. to about 50° C., usually promote a product having a small particle size, generally about the size of talcum powder. Temperatures of up to about 80° C. usually produce a product consisting of discrete particles of a slightly larger size. The use of crystal modifiers, e.g., isopropyl alcohol or glycerin to decrease the solubility of the barium styphnate product in the precipitation medium inhibits the growth of large crystals and may be utilized with advantage in the present invention to produce a barium styphnate product of a fine particle size.

The following examples are illustrative of the process of the present invention:

EXAMPLE 1

10 grams of styphnic acid was suspended in 200 ml. of water containing 10 ml. of concentrated ammonium hydroxide. The suspension was agitated at 26° C. At the end of a 10 minute time period a clear solution of ammonium styphnate was obtained.

The solution was then heated to 80° C. and a solution of barium chloride dihydrate (10 grams in 75 ml. of water) was added over a time period of two minutes. A yellow precipitate formed immediately upon the addition of the barium chloride solution. The mixture was then cooled in a water bath to 25° C. for a period of 15 minutes. The precipitated product was then filtered and washed with water and acetone. After drying the barium styphnate product was found to be crystalline and quite uniform in size. The size of the product was approximately within the range of from about 10 to about 100 microns. The yield was 13.76 grams and the product had a nitrogen content of 10.17%.

EXAMPLE 2

5 grams of styphnic acid were suspended in a solution of 85 ml. of water and 5 ml. of concentrated ammonium hydroxide. The suspension was agitated at 28° C. and during the agitation a solution containing 1.25 grams of sodium hydroxide in 20 ml. of water was slowly added. A relatively clear solution of sodium styphnate was formed. A solution of 7.5 grams of barium chloride dihydrate in 50 ml. of water was added to the sodium styphnate solution. An extremely fine yellow precipitate was immediately formed. The mixture was agitated for three minutes at 28° C. and then 50 ml. of water was added. The precipitate product, barium styphnate, was removed by filtration and washed with water and acetone. After drying a yield of 6.67 grams of barium styphnate was obtained having a nitrogen content of 10.27%. The product was in the form of extremely fine needle-like crystals with a particle size of from about 10 to about 35 microns.

EXAMPLE 3

A solution of ammonium styphnate was prepared from 10 grams of styphnic acid, 8 ml. of ammonium hydroxide and 100 ml. of water. An aqueous solution of barium chloride dihydrate was prepared using 15 grams of the barium salt diluted to 100 ml. 18.5 ml. of the ammonium styphnate solution was diluted with 20 ml. of isopropyl alcohol and heated to 50° C. 10 ml. of the barium chloride solution was also diluted with 20 ml. of isopropyl alcohol and heated to 50° C. The two solutions at 50° C. were mixed together over a time period of 30 seconds with vigorous agitation. A precipitate of barium styphnate immediately formed. The suspension was then cooled to 25° C. and the precipitate product removed by filtration and washed with water and acetone. After drying the barium styphnate product appeared in the form of yellow crystals having a particle size between about 20 and about 60 microns and a nitrogen content of 10.29%.

What is claimed is:

1. Crystalline barium styphnate of uniform, fine particle size prepared by reacting at a temperature between about 25° C. and about 80° C. a solution of styphnate salt selected from the group consisting of ammonium styphnate and alkali metal styphnates with a water-soluble barium salt to precipitate crystalline barium styphnate.

2. Crystalline barium styphnate of claim 1 prepared from an alkali metal styphnate prepared by reacting styphnic acid with an aqueous solution of ammonium hydroxide to form an ammonium styphnate product and reacting that product with an alkali metal hydroxide to form an alkali metal styphnate.

References Cited
UNITED STATES PATENTS

| | | | |
|---|---|---|---|
| 1,942,274 | 1/1934 | Brun | 260—622 |
| 2,402,448 | 6/1946 | Richards | 252—42.7 |

OTHER REFERENCES
Babor et al.: "General College Chemistry" (1940), pp. 279.82.

BERNARD HELFIN, Primary Examiner

W. B. LONE, Assistant Examiner

U.S. Cl. X.R.

149—23, 111